US011392100B2

(12) United States Patent
Ramamurthy et al.

(10) Patent No.: US 11,392,100 B2
(45) Date of Patent: Jul. 19, 2022

(54) MODULARIZED ENERGY MANAGEMENT USING POOLING

(71) Applicant: Energy Harbors Corporation, Inc., Saratoga, CA (US)

(72) Inventors: Shankar Ramamurthy, Saratoga, CA (US); Robert A. Gingell, Jr., Sunnyvale, CA (US); Sudhir Ramtirth Joshi, Emerald Hills, CA (US)

(73) Assignee: Energy Internet Corporation, Saratoga, CA (US)

( * ) Notice: Subject to any disclaimer, the term of this patent is extended or adjusted under 35 U.S.C. 154(b) by 0 days.

(21) Appl. No.: 16/377,511

(22) Filed: Apr. 8, 2019

(65) Prior Publication Data

US 2019/0235457 A1    Aug. 1, 2019

Related U.S. Application Data

(63) Continuation-in-part of application No. 16/118,886, filed on Aug. 31, 2018, now Pat. No. 10,725,441.
(Continued)

(51) Int. Cl.
*G05B 19/042* (2006.01)
*H02J 15/00* (2006.01)
(Continued)

(52) U.S. Cl.
CPC ..... *G05B 19/042* (2013.01); *G06Q 10/06314* (2013.01); *G06Q 50/06* (2013.01);
(Continued)

(58) Field of Classification Search
None
See application file for complete search history.

(56) References Cited

U.S. PATENT DOCUMENTS 5,934,076 A    8/1999 Coney
7,743,609 B1 *  6/2010 Brostmeyer ............. F02C 6/16
                                                                60/398
(Continued)

OTHER PUBLICATIONS

Bullough et al., "Advanced Adiabatic Compressed Air Energy Storage for the Integration of Wind Energy", Nov. 2004, Proceedings of the European Wind Energy Conference, EWEC 2004 22-25, pp. 1-8 (Year: 2004).*
(Continued)

*Primary Examiner* — Mohammad Ali
*Assistant Examiner* — David Earl Ogg
(74) *Attorney, Agent, or Firm* — Adams Intellex, PLC

(57) ABSTRACT

Disclosed techniques include energy management based on modularized energy control using pooling. Operating data is obtained from a plurality of energy modules within an energy storage system. The plurality of energy modules is pooled. One or more operating goals are obtained for the plurality of energy modules. The operating goals can be based on cost, availability, or energy module status. One or more processors are used to analyze the operating data, the one or more operating goals, energy demand, and energy module operating health. The operation of one or more of the plurality of energy modules is controlled based on the analysis. The energy modules can be a pooled homogeneous bank of energy modules. The homogeneous banks can be pooled into heterogeneous energy modules. The pools can include dynamically added energy module peers.

27 Claims, 12 Drawing Sheets

Related U.S. Application Data

(60) Provisional application No. 62/795,133, filed on Jan. 22, 2019, provisional application No. 62/795,140, filed on Jan. 22, 2019, provisional application No. 62/784,582, filed on Dec. 24, 2018, provisional application No. 62/679,051, filed on Jun. 1, 2018, provisional application No. 62/654,718, filed on Apr. 9, 2018, provisional application No. 62/654,859, filed on Apr. 9, 2018, provisional application No. 62/552,747, filed on Aug. 31, 2017.

(51) Int. Cl.
*H02J 3/00* (2006.01)
*G06Q 50/06* (2012.01)
*G06Q 10/06* (2012.01)

(52) U.S. Cl.
CPC .............. *H02J 3/00* (2013.01); *H02J 15/003* (2013.01); *H02J 15/006* (2013.01); *G05B 2219/2639* (2013.01); *H02J 2203/20* (2020.01)

(56) References Cited

U.S. PATENT DOCUMENTS

| | | | |
|---|---|---|---|
| 8,600,571 B2* | 12/2013 | Dillon | G06Q 50/06 700/291 |
| 9,540,957 B2 | 1/2017 | Shinnar et al. | |
| 9,562,183 B2 | 2/2017 | Hidalgo et al. | |
| 9,568,235 B2 | 2/2017 | Dobbs | |
| 9,631,846 B2 | 4/2017 | Chen et al. | |
| 9,651,030 B2 | 5/2017 | Kim et al. | |
| 9,664,140 B2 | 5/2017 | Kalika | |
| 9,784,459 B2* | 10/2017 | Langheinz | F24F 5/0021 |
| 2003/0036806 A1 | 2/2003 | Schienbein et al. | |
| 2007/0279953 A1* | 12/2007 | Hoff | H01M 2/105 363/87 |
| 2008/0034756 A1* | 2/2008 | Spalte | F02C 7/12 60/641.3 |
| 2008/0046387 A1 | 2/2008 | Gopal et al. | |
| 2008/0071705 A1 | 3/2008 | Enis et al. | |
| 2008/0172279 A1 | 7/2008 | Enis et al. | |
| 2009/0200805 A1 | 8/2009 | Kim et al. | |
| 2009/0319090 A1 | 12/2009 | Dillon et al. | |
| 2010/0308765 A1 | 12/2010 | Moore et al. | |
| 2012/0053737 A1 | 3/2012 | Valluri et al. | |
| 2013/0336721 A1* | 12/2013 | McBride | E21D 11/00 405/55 |
| 2014/0039710 A1 | 2/2014 | Carter et al. | |
| 2014/0129042 A1 | 5/2014 | Miner | |
| 2014/0172182 A1 | 6/2014 | Subbotin et al. | |
| 2015/0121113 A1* | 4/2015 | Ramamurthy | H02J 9/062 713/340 |
| 2015/0143806 A1 | 5/2015 | Friesth | |
| 2015/0194820 A1* | 7/2015 | Liang | H02J 1/10 320/134 |
| 2015/0349531 A1* | 12/2015 | Vor Dem Esche | H02J 3/30 307/20 |
| 2016/0207703 A1* | 7/2016 | Elazari-Volcani | F17C 1/007 |
| 2016/0336928 A1 | 11/2016 | Kuznetsov | |
| 2017/0005515 A1* | 1/2017 | Sanders | H02J 3/32 |
| 2017/0038157 A1 | 2/2017 | O'Donnell et al. | |
| 2017/0044414 A1 | 2/2017 | Sutterlin et al. | |
| 2017/0067667 A1 | 3/2017 | Choi | |
| 2017/0082060 A1 | 3/2017 | Kalika | |
| 2017/0082123 A1 | 3/2017 | Momen et al. | |
| 2017/0082380 A1 | 3/2017 | Gauche et al. | |
| 2017/0159495 A1 | 6/2017 | Laughlin et al. | |

OTHER PUBLICATIONS

Lund et al., "The role of compressed air energy storage (CAES) in future sustainable energy systems", 2009, Energy Conversion and Management 50 (2009), pp. 1172-1179 (Year: 2009).*

* cited by examiner

MODULARIZED ENERGY MANAGEMENT USING POOLING

RELATED APPLICATIONS

This application claims the benefit of U.S. provisional patent applications "Modularized Energy Management Using Pooling" Ser. No. 62/654,718, filed Apr. 9, 2018, "Energy Storage and Management Using Pumping" Ser. No. 62/654,859, filed Apr. 9, 2018, "Power Management Across Point of Source to Point of Load" Ser. No. 62/679,051, filed Jun. 1, 2018, "Energy Management Using Pressure Amplification" Ser. No. 62/784,582, filed Dec. 24, 2018, "Energy Management Using a Converged Infrastructure" Ser. No. 62/795,140, filed Jan. 22, 2019, and "Energy Management Using Electronic Flywheel" Ser. No. 62/795,133, filed Jan. 22, 2019.

This application is also a continuation-in-part of U.S. patent application "Energy Management with Multiple Pressurized Storage Elements" Ser. No. 16/118,886, filed Aug. 31, 2018, which claims the benefit of U.S. provisional patent applications "Energy Management with Multiple Pressurized Storage Elements" Ser. No. 62/552,747, filed Aug. 31, 2017, "Modularized Energy Management Using Pooling" Ser. No. 62/654,718, filed Apr. 9, 2018, "Energy Storage and Management Using Pumping" Ser. No. 62/654,859, filed Apr. 9, 2018, and "Power Management Across Point of Source to Point of Load" Ser. No. 62/679,051, filed Jun. 1, 2018.

Each of the foregoing applications is hereby incorporated by reference in its entirety.

FIELD OF ART

This application relates generally to energy management and more particularly to modularized energy management using pooling.

BACKGROUND

The demand for energy of all varieties increases as towns, cities, states, and countries grow. The growth in energy demand can result from increases in standards of living such as bringing electrical infrastructure to rural areas or expanding transportation networks. As a result of growth and expansion, energy production continues to increase. Energy producers, government agencies, and responsible consumers strive to initiate, enforce, and practice energy conservation measures, respectively. Turning off lights when leaving a room, lowering the thermostat in winter or raising the thermostat in summer, or purchasing energy-efficient appliances, are all popular approaches. However, despite many good efforts at energy conservation, the demands for energy are increasing beyond the demand reductions that conservation alone has been able to achieve. As a result, many analysts are identifying the energy situation as a crisis. The energy demand increases have many root causes. Overconsumption of energy has imposed strains on natural resources ranging from fossil fuels to renewables such as wood chips, resulting in shortages and increased environmental damage and pollution. Increasing populations and the desire to provide electricity to previously underserved or unserved regions further put strains on energy sources as the numbers of energy consumers who can now perform daily tasks such as washing, cooking, entertaining, illuminating, or heating and cooling of their houses and apartments have increased. In addition to domestic use, the increase in energy demand further results from expanded economic activities such as manufacturing, transportation, and retail, to name but a few.

Energy distribution problems are frequently identified as hindrances to solving the energy crisis. Insufficient electrical and other energy distribution infrastructure, along with aging or inadequate energy generation equipment, are unable to operate apace with the increased energy demands. Renewable energy options remain largely unexplored or underdeveloped due to underfunding and local pushback. There is at times angry and vociferous resistance by adjacent landowners and others to siting windmills, solar farms, or wood burning plants within their viewscapes. Even when plans can be made to construct such energy producing facilities, energy distribution is stymied by the aging and inadequate distribution infrastructure. Commissioning new energy generation facilities remains a seemingly unobtainable goal. Legal wrangling, construction delays, pollution mitigation requirements, crushing costs, or war, have prevented, halted, or delayed new energy generation facilities coming online. Energy wastage also is a major factor. Aging appliances or manufacturing equipment, incandescent light bulbs, plus poor building insulation and air sealing, all waste energy in comparison to their modern counterparts To address the increases in energy demands, public officials and city planners have been confronted with choosing among three broad choices: to increase energy production through building new power plants, to reduce energy demand through energy conservation measures, or to combine both of these methods. Another emerging option is to source energy production based on renewable energy sources such as solar, wind, geothermal, wave action, tidal, and so on. The primary limitation to sole reliance on renewable energy sources is the sporadic nature of these energy sources. For example, solar sources produce energy only in the presence of light. Further, the amounts of energy produced vary depending on the intensity of the light hitting the photovoltaic panels. Energy sources and energy demands must be balanced so that clean and reliable energy is consistently available to all consumers countrywide.

SUMMARY

Modular energy management supposes that energy is produced to at least meet the demands for energy at a given time. The demands for the energy include manufacturing and production, transportation, lighting, heating and cooling, operating hospitals and schools, running households, and so on. The energy produced can exceed energy demands at a given time, based on the type of energy production. When an excess of energy is available, the excess energy can be stored. The storing of the excess energy can include short-term storage to meet demand peaks or to cover short disruptions of energy sources, or can include long-term storage. The long-term storage of energy is of heightened interest to energy producers and consumers alike as overall energy demands increase. The long-term energy storage can capture and store for later use excess energy produced using conventional techniques. Long-term storage can further capture and store energy produced by less reliable or intermittent energy sources including renewable energy sources such as solar, wind, or tidal sources. The storage of the excess energy or renewable energy at the time of production enables access to energy when the renewable energy is not being or cannot be produced. Long-term energy storage also has cost advantages. Storing energy when the energy production costs are low then accessing the stored energy when energy production costs are high can balance out production costs, reduce overall energy production costs, etc.

Energy production and energy consumption each can vary over a given period of time. The period of time can be relatively short such as an hour or a few hours, or much longer such as a day, week, month, season, year, and so on. The shortfall or gap between energy production and energy consumption can increase or decrease over the given period of time. This shortfall can further depend on day versus night, day of the week, manufacturing schedules, seasonal factors such as heating during cold months or cooling during hot months, and so on. The shortfall indeed can be quite large and can be attributed to a variety of factors. The factors can include time-dependent energy demands, changeable energy production capabilities due to the presence or absence of a renewable resource used to generate the energy, available capacity of grid power, the amount of standby or backup energy, and so on. To help ameliorate the energy production/consumption imbalances, energy can be stored when surplus energy is available, and the stored energy can be sourced when demand exceeds a given power demand level. Energy can be collected and stored when a renewable resource is available, when energy available is in excess of power needed, or even when the cost of production of the power is relatively inexpensive. The stored energy can be used to augment other energy sources such as grid power, or can provide the amount of energy that is needed during periods of increased or unmet energy requirement. The recovery of stored energy can be scaled and applied to low-level energy demand scenarios, such as the energy needs of a house or small operation such as a farm, to larger scale energy needs such as manufacturing, or to the largest energy needs of an energy distribution grid.

Disclosed techniques address modularized energy management using pooling of multiple pressurized storage elements. Operating data is obtained from a plurality of energy modules within an energy storage system. The operating data can include availability status of a pressurized storage element; state of charge of a storage element such as a vessel, battery, capacitor, etc.; pressure level; and so on. One or more operating goals are obtained for the plurality of energy modules. The operating goals can include target pressure, preferred state of charge, hours of use, etc. The operating goals can include critical state avoidance, where the critical state can be determined based on system simulation. One or more processors are used to analyze the operating data, the one or more operating goals, energy demand, and energy module operating health. The operation of one or more of the plurality of energy modules is controlled based on the analysis. The controlling the operation of the one or more of the plurality of energy modules can include, among other techniques, dynamically changing the number of energy modules within the plurality of energy modules. An energy module can include a compressed air chamber, a high-pressure chamber, a compression-expansion chamber, ice, steam, and so on.

Various features, aspects, and advantages of various embodiments will become more apparent from the following further description.

BRIEF DESCRIPTION OF THE DRAWINGS

The following detailed description of certain embodiments may be understood by reference to the following figures wherein.

DETAILED DESCRIPTION

Figure 1:
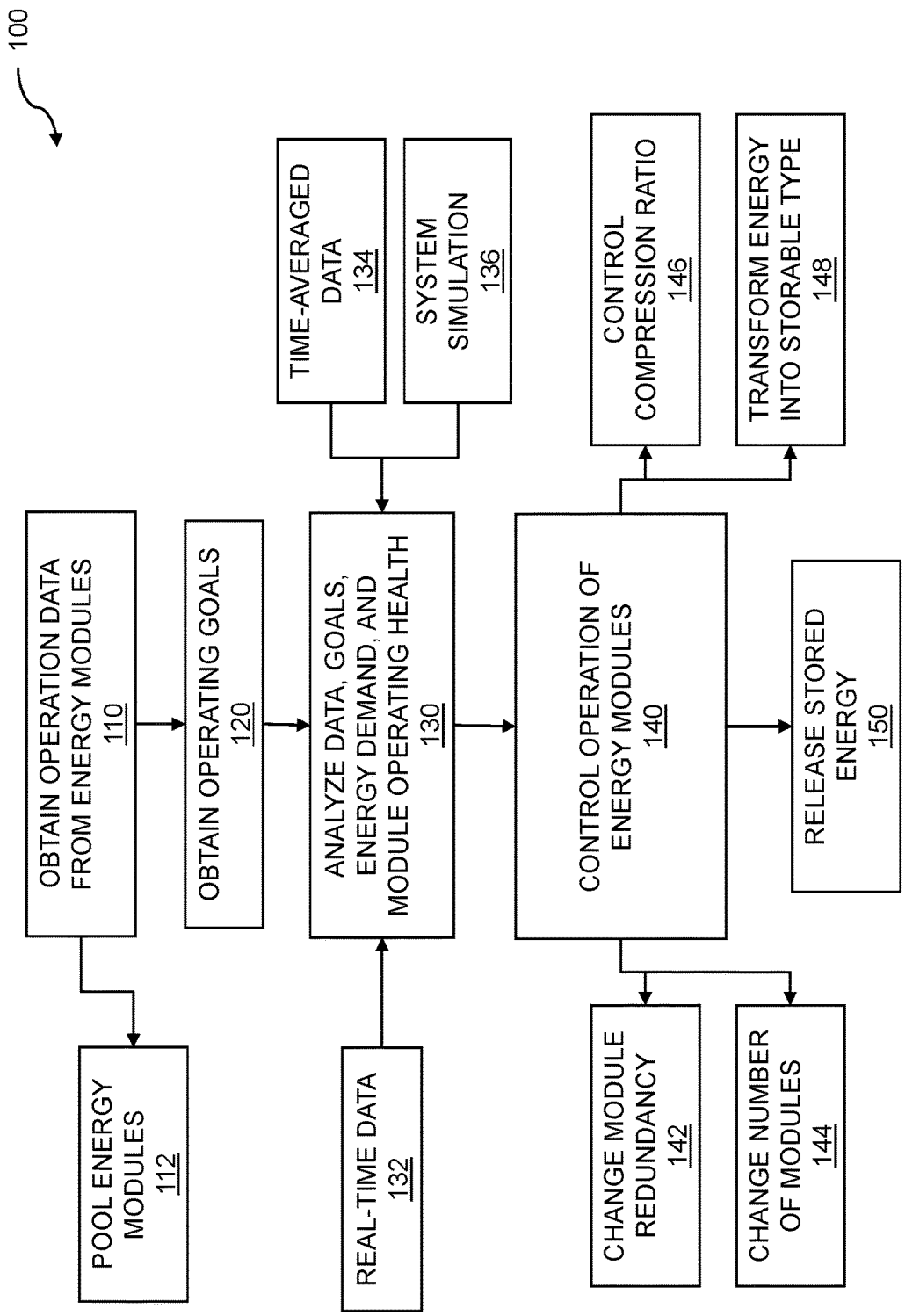
FIG. 1 is a flow diagram for modularized energy management using pooling.

This disclosure provides techniques for modularized energy management using pooling. The modularized energy management is based on pump-energy storage, where the pump-energy storage includes a variety of energy modules. The energy modules can be pooled so that they can be added as needed to achieve a higher level of energy or removed when a lower level of energy will suffice. The energy modules include multiple pressurized storage elements such as compressed air storage elements. Managing the sourcing, storing, and extracting of energy is a complex and highly challenging task. Energy management can be influenced by many factors including the weather, fluctuating energy demand, variable pricing schemes, and so on. Energy management can be further complicated by quickly changing customer energy demands, requirements of service level agreements (SLAs), etc. Despite the growing use of renewable energy resources such as solar, wind, wave action, geothermal, and the like, two significant challenges remain: the amount of energy produced by a given renewable energy source is highly variable, and the availability of the renewable energy source is inconsistent. As an example, solar energy is only available when sunlight is present, wind energy only when the wind is blowing, wave action energy only when there is wave action, and so on.

Energy with intermittent availability can be cached or stored when the energy is being produced, then later extracted when the stored energy is needed. A similar strategy can be used based on price, where energy is stored when it is inexpensive to produce, then later extracted when the cost of energy production is high. The stored energy can be used in combination with other energy sources such as grid power to meet energy demands. Storage can include a period of time, where the period of time can be a short-term basis or a long-term basis. Here, a short-term basis can include an integer number of seconds, minutes, hours, or days, where the integer number of seconds, minutes, hours, or days comprises a length of time substantially less than one week. A long-term basis can include an integer number of weeks, months, seasons, or years, where the integer number of weeks, months, seasons, or years comprises a length of time substantially more than one day. Energy losses are introduced when converting energy from one energy type to another energy type. Further losses occur when storing energy, extracting energy, routing energy, etc. Minimizing the energy losses is critical to any energy retrieval/recovery technique. Electrical energy storage has been possible using techniques such as mature storage battery technologies, but the costs of large battery banks are prohibitive. Further, batteries are problematic for long-term storage purposes due to the possibility of charge leakage. Usage of batteries on a large scale, especially for multi-month storage for example, is simply not a viable solution.

In disclosed techniques, modularized energy management uses pooling of multiple energy modules including pressurized storage elements. Operating data is obtained from a plurality of energy modules within an energy storage system. The operating data can include availability status, state of charge, pressure level, and so on. One or more operating goals are obtained for the plurality of energy modules. The operating goals can include target pressure, preferred state of charge, hours of use, etc. The operating goals can include critical state avoidance, where the critical state can be determined based on system simulation. One or more processors are used to analyze the operating data, the one or more operating goals, energy demand, and energy module operating health. The operation of one or more of the plurality of energy modules is controlled based on the analysis. Controlling the operation of the one or more of the plurality of energy modules can include dynamically changing the number of energy modules within the plurality of energy modules. The compression and expansion of air can be achieved by a plurality of vessels, pumps, valves, and other auxiliary equipment, called components. These components will be arranged or connected according to a loose coupling concept such that the software operating system can bypass any non-functioning component and reroute the process using another similar component. This will allow the non-functioning component to be serviced and put back into operation. This modularization architecture increases resilience of the operation, improves predictive maintenance scheduling, and improves productivity and on-stream of the entire system. This also allows the system to connect heterogeneous components based on different operating principles that execute similar functions together to carry out the process and manage mismatch of capacity within the operating realm.

A computer-implemented method for energy management is disclosed comprising: obtaining operating data from a plurality of energy modules within an energy storage system; obtaining one or more operating goals for the plurality of energy modules; analyzing the operating data, the one or more operating goals, energy demand, and energy module operating health; and controlling operation of one or more of the plurality of energy modules, based on the analyzing, wherein two or more of the plurality of energy modules are pooled. In embodiments, the plurality of energy modules that is pooled comprises a homogeneous bank of energy modules. In embodiments, the plurality of energy modules that is pooled comprises two or more homogeneous banks of heterogeneous energy modules.

FIG. 1 is a flow diagram for modularized energy management using pooling. Energy storage and extraction can be based on modularized energy management using pooling. The pooling can include adding or removing energy modules as needed for energy storage or extraction based on energy demand. The energy modules can include multiple pressurized storage elements. Energy is obtained from one or more energy sources such as grid power, renewable micro-grid power, etc. Operating data is obtained from a plurality of energy modules within an energy storage system. One or more operating goals are obtained for the plurality of energy modules. One or more processors are used to analyze the operating data, the one or more operating goals, energy demand, and energy module operating health. The operation of one or more of the plurality of energy modules is controlled based on the analysis.

A flow 100 for modularized energy management using pooling is shown. Energy can be stored and retrieved or extracted from multiple energy modules, where the storage modules can include pressurized storage elements. The pressurized storage elements can include pump-turbine elements, high-pressure chambers, compression-expansion chambers, compressed air chambers, and so on. In embodiments, the pressurized storage elements can include a nonproductive oil well infrastructure, unused salt caverns, aquifers, large cavities underground, or porous rock structures capable of holding air or water under pressure. The chambers of the pressurized storage elements can include pressurized capsules, pressurized bladders, pressurized accordion-fold bags, and so on, for storing compressed air, steam, liquids (e.g. water), etc. Other storage modules can include batteries, inductors, capacitors, etc. The storage modules can store various types of energy including electrical energy, thermal energy, kinetic energy, mechanical energy, and so on. The flow 100 includes obtaining operating data from a plurality of energy modules 110 within an energy storage system. The operating data can include a variety of factors, parameters, status information updates, and so on, related to one or more energy modules. The operating data can include pressure, temperature, voltage, charge, etc. The operating data can include information relating to energy modules which are available for use, down for maintenance, and the like. In embodiments, the plurality of energy modules is pooled 112. The pooling of energy modules can include adding energy modules to or subtracting energy modules from an energy storage system. In embodiments, the plurality of energy modules that are pooled can include energy module peers. The energy module peers can include energy modules with substantially similar capabilities. The energy module peers can include pump-turbine peers, high-pressure container peers, or compression-expansion chamber peers.

The flow 100 includes obtaining one or more operating goals 120 for the plurality of energy modules. The operating goals can include providing an amount of energy, where the amount of energy can be provided at a point in time, for a period of time, and so on. The operating goals can include seasonal factors such as providing energy for heating or cooling, providing energy for lighting during more hours in winter, etc. The flow 100 includes analyzing, using one or more processors, the operating data, the one or more operating goals, energy demand, and energy module operating health 130. The analyzing can be used to determine the operating data from one or more energy modules to gauge whether the energy modules are operating properly, have a capacity to meet energy needs, etc. The analyzing operating goals can determine whether operating goals can be attained, whether the energy modules are operating within specifications, and the like. The analyzing can determine present energy demand or anticipated energy demand. The anticipated energy demand can be based on historical energy use data. In embodiments, the energy demand can include real-time data. The real-time data 132 can be collected from sensors associated with the energy modules or using other measurement techniques. In other embodiments, the energy demand comprises time-averaged data 134. The time-averaged data 134 can be based on daily averages, weekly averages, seasonal averages, etc. The analyzing energy module operating health can be used to confirm that an energy module is operating within specifications, to determine whether routine maintenance should be scheduled, to arrange emergency maintenance, etc. In embodiments, the analyzing includes system simulation 136. The system simulation can be used to make predictions about energy needs.

The system simulation can be applied to the historical data, the real-time data, the time-averaged data, etc. In embodiments, the system simulation enables critical state avoidance. The critical state avoidance can be used to avoid energy system failure or shutdown.

The flow 100 includes controlling the operation of one or more of the plurality of energy modules 140, based on the analysis. The controlling the operation of an energy module can include coupling the energy module to an energy system, decoupling the energy module from the energy system, and so on. The controlling can include flipping one or more switches; opening, closing, or adjusting one or more valves; etc. The controlling can include turning on one or more pumps, turning off one or more pumps, and the like. In embodiments, the controlling the operation of the one or more of the plurality of energy modules can include changing energy module redundancy 142. The energy module redundancy can include 1N redundancy, 1N+1 redundancy, 2N redundancy, and so on. The energy module redundancy can include a safety margin, backup energy sources, etc. Controlling the operation of the one or more of the plurality of energy modules can include dynamically changing the number of energy modules 144 within the plurality of energy modules. The number of energy modules can be changed to increase capacity (add), decrease capacity (subtract), change redundancy as discussed, etc. The dynamic changing of the number of energy modules can occur during operation of the energy system, or "on the fly". In other embodiments, the controlling can include controlling a compression ratio 146 between one or more of the plurality of energy modules. The compression ratio can include a value, a range of values, a relative value, etc.

In further embodiments, the controlling can further include transforming energy into a storable energy type 148. Energy that can be transformed can include solar energy, wind energy, geothermal energy, wave-action energy, and so on. The energy that can be transformed can include electrical energy, mechanical energy, chemical energy, and the like. The storage energy type can include electrical energy, potential energy, kinetic energy, hydrostatic energy, and so on. The energy storage can include storing energy for a period of time. In embodiments the period of time for which the energy is stored can be a short-term basis, while in other embodiments, the time period can be a long-term basis. The short-term basis for storage of the energy can be an integer number of seconds, minutes, hours, or days, where the integer number of seconds, minutes, hours, or days includes a length of time substantially less than one week. Other amounts of time can be included for energy storage. The long-term basis can be an integer number of weeks, months, seasons, or years, where the integer number of weeks, months, seasons, or years includes a length of time substantially more than one day. The flow 100 can include extracting or releasing stored energy 150. The energy can be stored in various pooled energy storage elements for subsequent release and use, either within or without the energy storage system. In embodiments, the controlling further comprises release of stored energy from a storage element within the energy storage system. Various steps in the flow 100 may be changed in order, repeated, omitted, or the like without departing from the disclosed concepts. Various embodiments of the flow 100 can be included in a computer program product embodied in a non-transitory computer readable medium that includes code executable by one or more processors.

Figure 2:
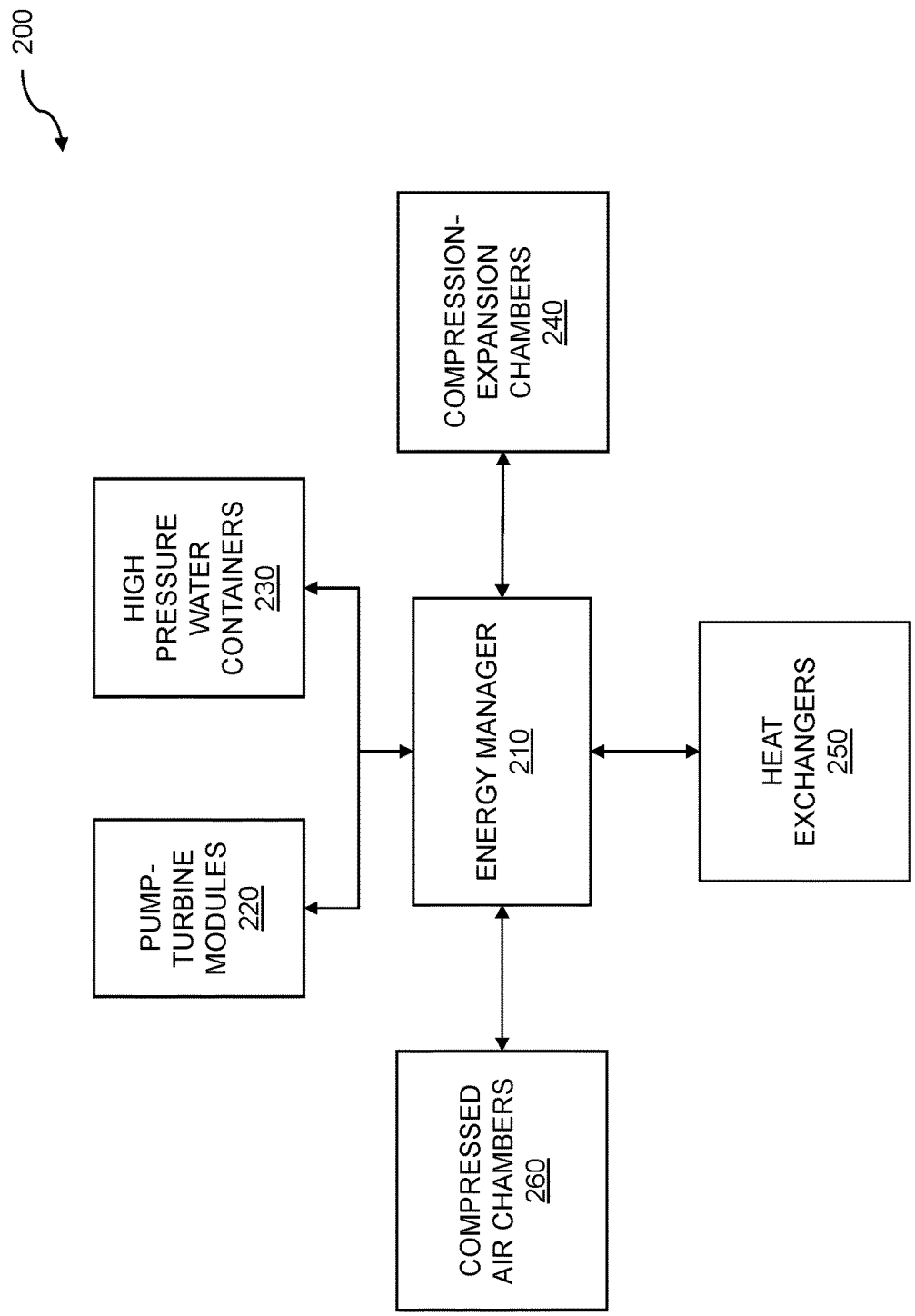
FIG. 2 is a system diagram for managing energy storage components.

FIG. 2 is a system diagram for managing energy storage components. The energy storage components can comprise a pump-turbine system. The energy storage components can be used to store energy in various forms such as charge, heat, pressure, and so on. The system 200 includes an energy manager 210. The energy manager can be used to add energy modules, to subtract energy modules, to control the energy modules, etc. The control of the energy modules can be based on system simulation, where the system simulation can enable critical state avoidance. The system 200 can include pump-turbine modules 220. The pump-turbine modules can be used to pump a gas such as air or nitrogen, a liquid such as fresh water or salt water, and so on. The pump-turbine system can utilize high-pressure storage. The system 200 can include a plurality of high-pressure containers 230. The high-pressure containers can include tanks or capsules which can be located above ground or underground, submerged in liquid, and so on. In embodiments, the plurality of high-pressure containers can be operated at substantially the same high-pressure point. The high-pressure containers operated at substantially the same high-pressure point can be operated in parallel. In other embodiments, the plurality of high-pressure containers is operated at substantially different high-pressure points. The high-pressure containers can contain gas, liquid, or both. In embodiments, the plurality of high-pressure containers contains water held at high pressure.

The system 200 can include a pump-turbine system that utilizes compression-expansion chambers 240. The compression-expansion chambers can include a rigid structure such as a tank with a piston for increasing or decreasing tank volume. The compression-expansion chambers can include a "soft" structure such as a bladder. The bladder can include a capsule, an accordion-fold bag, an expandable bag, and so on. In embodiments, the compression-expansion chambers of the system 200 can include heat exchangers 250. Recall that temperature is related to pressure; the temperature of a gas increases when it is compressed and decreases when it is decompressed. The amount of heating and cooling can be significant, where the heating can be sufficient to cause a liquid such as water to boil, or where the cooling can be sufficient to cause the liquid such as water to freeze. In embodiments, the pump-turbine system can utilize a water heat exchanger. The thermal energy extracted by the heat exchangers can be stored as steam, an ice slurry, solid nitrogen, etc. In embodiments, the water heat exchanger can provide heat control for one or more energy modules within the energy storage system. The heat control can be used to keep an energy module from overheating, from freezing up, etc. The system 200 can include a pump-turbine system that utilizes a compressed air chamber 260. The compressed air chamber can be located on land, submerged in liquid such as fresh water or sea water, and so on. In embodiments, the compressed air storage is underground. The compressed air storage can be implemented within a non-productive oil well infrastructure. The compressed air chamber can be facilitated by deep water pressure. That is, by locating the compressed air chamber at a depth such as 100 meters or greater, the pressure exerted by the water on the compressed air chamber can greatly enhance the storage capabilities of the compressed air chamber. In embodiments, the compressed air storage can be under seawater.

Figure 3:
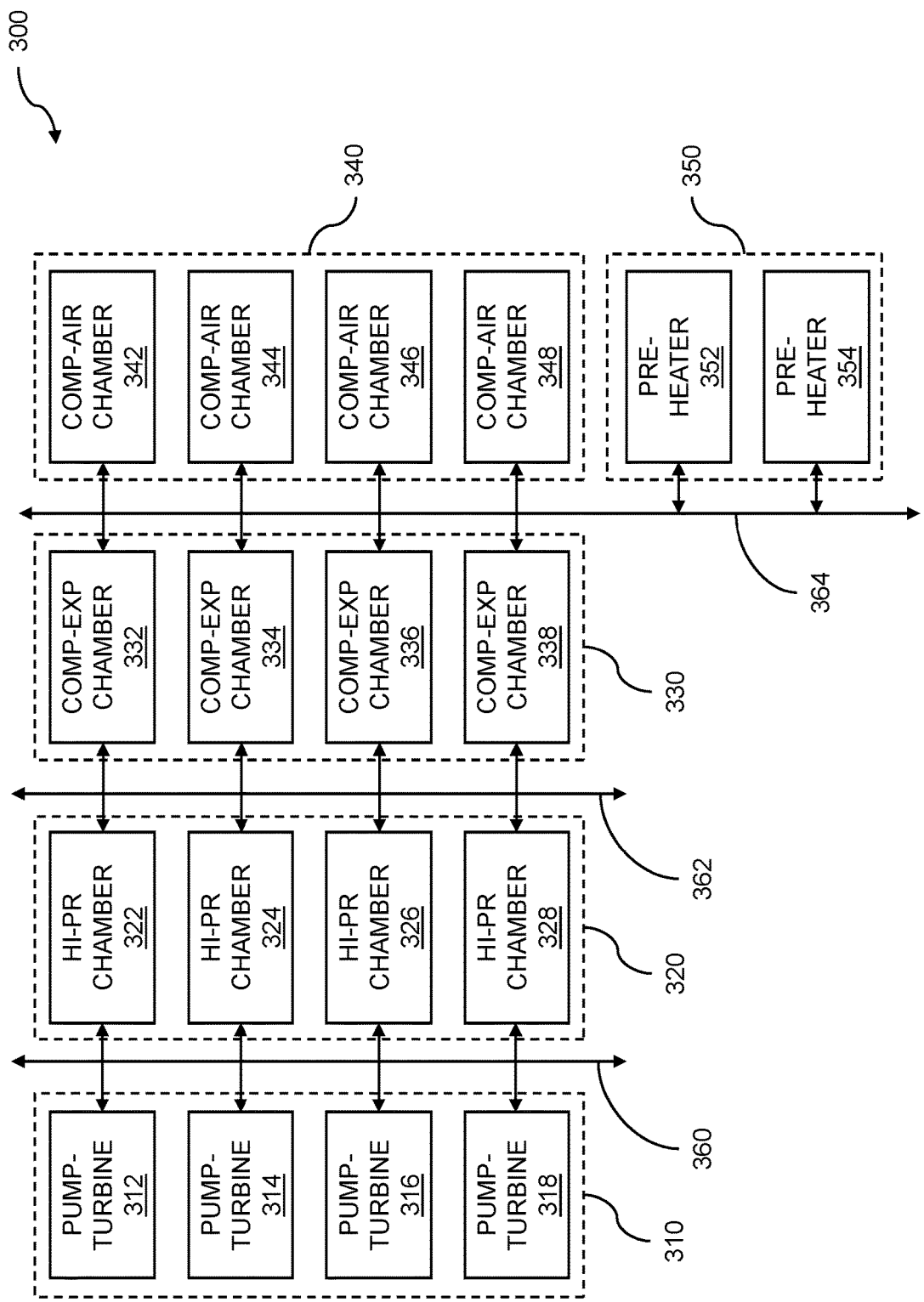
FIG. 3 shows energy storage pooling with architectural modularity.

FIG. 3 shows energy storage pooling with architectural modularity. Pooling of energy modules, which can include energy module peers, supports modularized energy management. Energy storage pooling 300 enables an energy management system to adapt based on changing energy demands, the number of various energy module peers available, and so on. The pooling enables the energy management system to operate using a quantity of energy modules suitable to meeting energy needs. States of the energy modules can include different states of operation such as on or off, a percentage of maximum capacity, etc. The energy modules can be operated with substantially similar or different parameters such as pressures, temperatures, flowrates, and so on. The energy modules can be added to or removed from the energy system while the system is "hot". That is, the module additions or subtractions can be made without disrupting operation of the energy system. This "hot swapping" of modules can also be used to support maintenance of the energy modules.

An example including energy storage pooling with architectural modularity is shown. The architecture can include various energy module peers. The energy module peers can include one or more pump-turbine peers 310, high-pressure chamber peers 320, compression-expansion chamber peers 330, or compressed-air chamber peers 340. The pooling of the types of peers can include modules comprising one or more peers. The pump-turbine peers 310 can include pump-turbines 312, 314, 316, and 318; the high-pressure chamber peers 320 can include high-pressure chambers 322, 324, 326, and 328; the compression-expansion peers 330 can include compression-expansion chambers 332, 334, 336, and 338, and the compressed-air chamber peers 340 can include compressed-air chambers 342, 344, 346, and 348. The architectural modularity of the energy system can enable addition or subtraction of peers as the capabilities of the peers are needed to meet energy demands. An example of the architectural modularity includes pre-heater peers 350. The pre-heater peers can include a first pre-heater 352 and a second pre-heater 354. The pre-heaters can include an external fuel supply for each peer (not shown). The various architectural modules can be interconnected. The interconnections, such as interconnections 360, 362, and 364, can include one or more interconnections between architectural modules. The interconnections can include pipes for transporting gases or liquids, cables for transferring charge, and so on.

Figure 4:
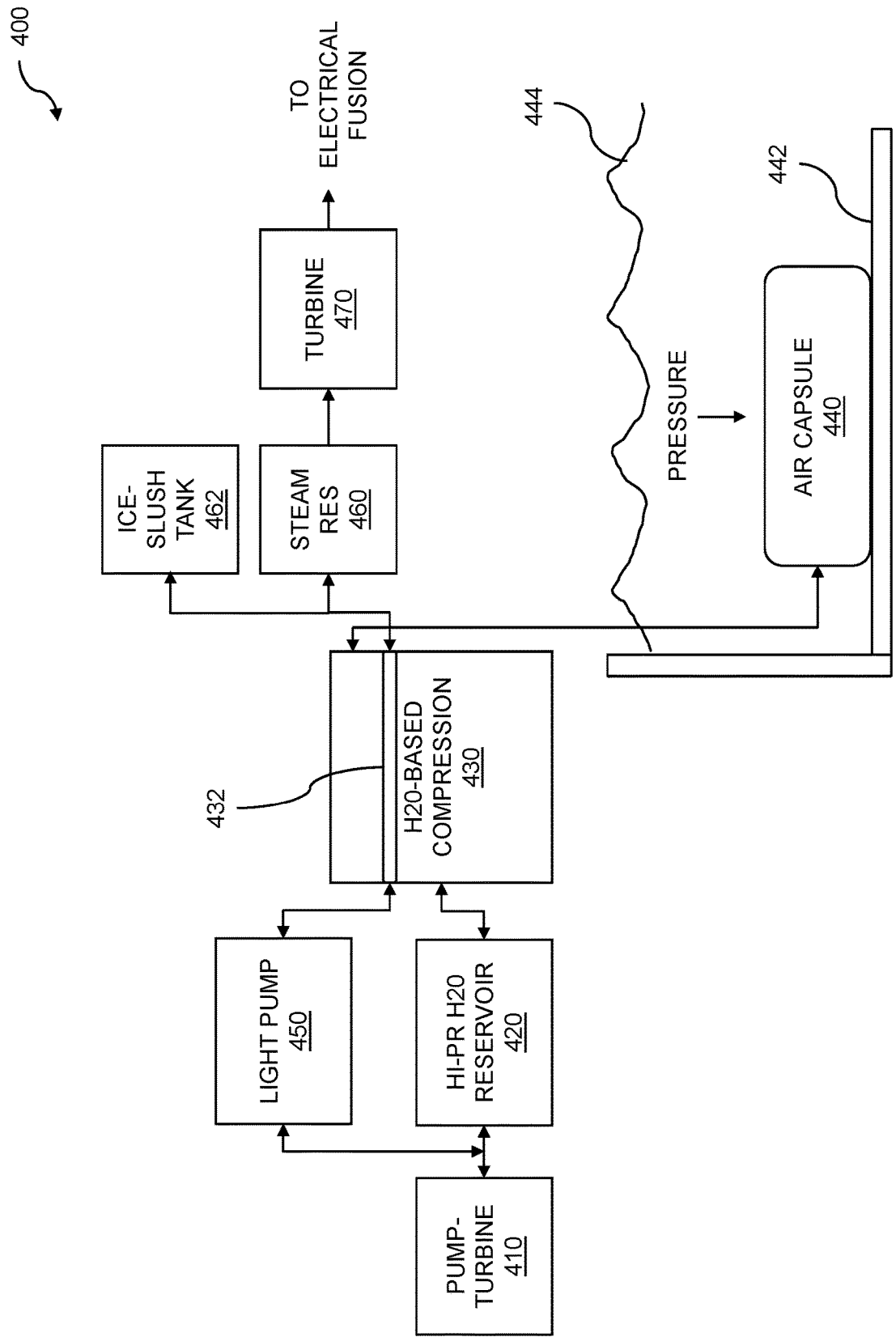
FIG. 4 illustrates pump-energy storage.

FIG. 4 illustrates pump-energy storage 400. Pump-energy storage supports modularized energy management using pooling. Pump-energy storage comprises various modules which can store energy of various types. The types of energy that can be stored can include electrical energy, thermal energy, kinetic energy, mechanical energy, and so on. Pump-energy storage can include a pump-turbine 410. The pump-turbine can be used to pressurize a storage vessel such as a tank, capsule, bladder, and so on. The pump-turbine can be operated electrically to move or pressurize a liquid or gas. The pump-turbine can also be operated by releasing pressure from the storage vessel for stored energy extraction. The pump-energy storage can include a high-pressure water reservoir 420. The high-pressure water reservoir can be used to provide pressurized water which can be used to exert pressure on a gas such as air, nitrogen, etc. The pump-energy storage can include water-based high compression 430. The water-based high compression can be accomplished with a vessel such as 430, where water (at the bottom of the vessel) is isolated from a gas such as air (at the top of the vessel) by an interface, barrier, membrane, sack, and so on. The high-pressure water from the high-pressure water reservoir can be used to increase the volume of pressurized water in the vessel 430 thus increasing the pressure of the air. The water-based compression can include a heat exchanger 432. As the pressure of the air at the top of the vessel 430 is increased, the temperature of the air can also be increased. The exchanger can be used to extract and store that waste heat from the air. A light pump 450 can be used to move the heat extracted from the water-based compression. In embodiments, the heat exchanger can include a water heat exchanger. The light pump can move the heated water for storage.

The pump-energy storage can include an air capsule 440. The air capsule can be located on land, at the bottom of a body of water 442, beneath a seabed, in unused oil infrastructure, etc. The air capsule can be pressurized by a hydraulic head. The hydraulic head can be determined by the distance between the surface of the body of water 444 and the bottom of the body of water 442. The body of water can include fresh water or seawater. In embodiments, the distance between the water surface and the bottom can be 100 meters or greater. The pump-energy storage can include storage for thermal energy. Thermal energy can be stored in a steam reservoir 460 as heat, in an ice-slush tank 462 as cold, and so on. The pump-energy storage can include a turbine 470. Steam from the steam reservoir can be used to spin a turbine to generate electricity. In this way, stored energy from multiple energy modules can be converted, or fused, into electrical energy. The electrical-fusion-generated electricity can be returned to an electrical grid, distributed to an electrical micro-grid, used on-site to meet energy demand, and so on.

Figure 5:
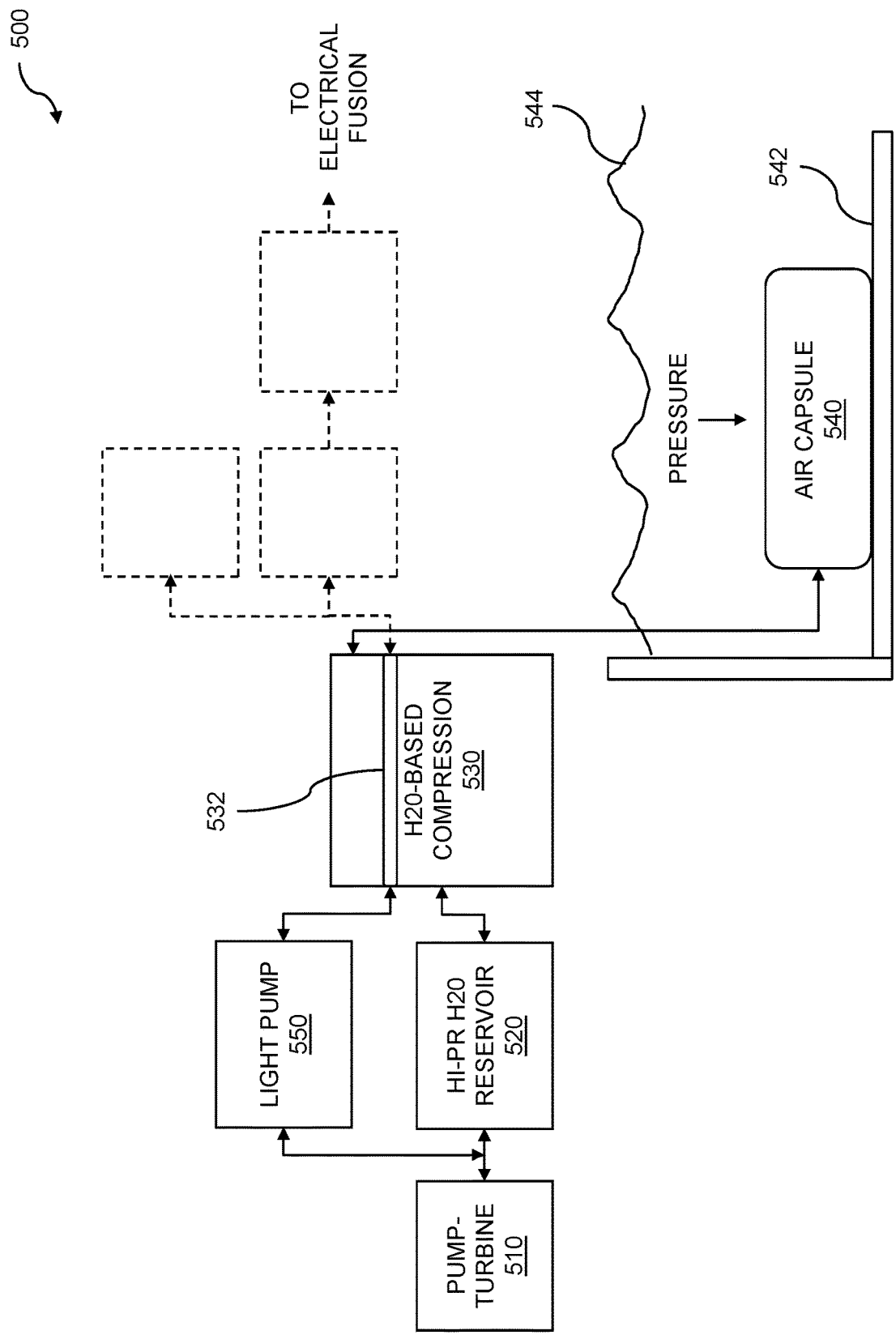
FIG. 5 shows pump-energy storage operation.

FIG. 5 shows pump-energy storage operation 500. Modularized energy management using pooling of energy modules can include storing of energy. Pump-energy storage has been described elsewhere. The storage operation comprises a subset of the operations performed for pump-energy storage. A pump-turbine 510 operates to pressurize or maintain pressure on a high-pressure water reservoir 520. The water from the high-pressure water reservoir can increase pressure on air in a water-based compression chamber 530. The air from 530 can be used to inflate or pressurize an air capsule 540. The air capsule can be located below the surface 544 of a body of water and on the bottom 542 of that body of water. Pressure of the water above the air capsule (hydraulic head) can maintain pressure on the air capsule. Heat generated by compressing air in the water-based compression chamber can be extracted using a heat exchanger 532. The heat exchanger can include a water heat exchanger. The heated water can be moved from the heat exchanger by a light pump 550. The heated water from the water heat exchanger can be stored.

Figure 6:
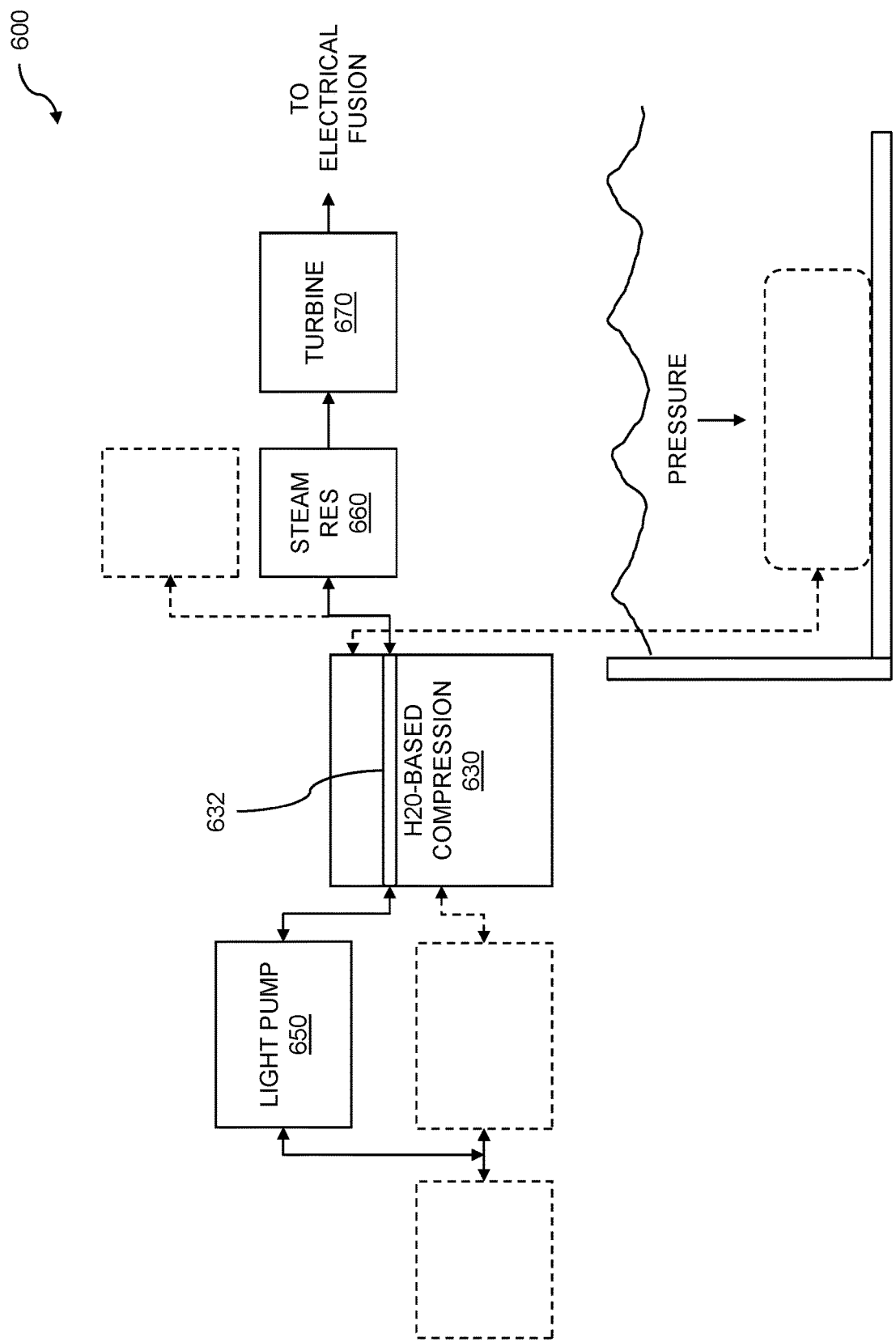
FIG. 6 illustrates waste heat recovery operation to steam.

FIG. 6 illustrates waste heat recovery operation 600 to steam. Compressing a gas causes the temperature of the gas to rise. The waste heat can be recovered and stored for later use as heat energy or can be converted to another form of energy such as electrical energy. Recovering the heat from the gas can support modularized energy management using pooling. Waste heat recovery comprises a subset of the operations performed for pump-energy storage. When heat is generated by compressing a gas such as air, nitrogen, or carbon-dioxide within a water-based compression chamber 630, the heat can be collected using a heat exchanger 632. In embodiments, the heat exchanger can include a water heat exchanger. The water heated by the heat exchanger can be moved by a light pump 650 and stored for later use. The heat from the heated air in the water-based compression chamber can be pumped to heat the steam in a steam reservoir 660. The steam from the steam reservoir can be used to spin a turbine 670 to generate electricity.

Figure 7:
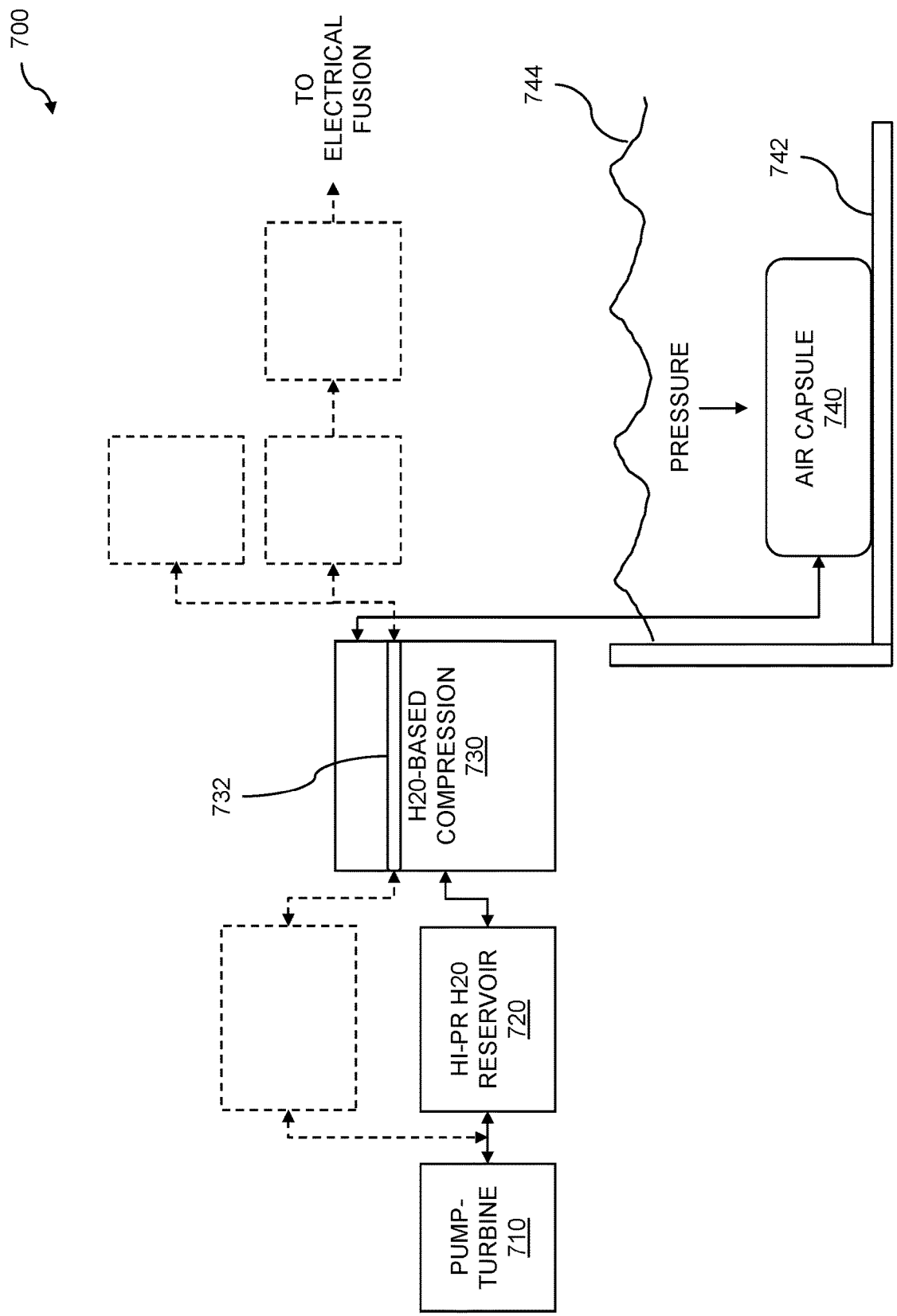
FIG. 7 shows pump-turbine energy recovery operation.

FIG. 7 shows pump-turbine energy recovery operation 700. Compressed gas such as air, nitrogen, or carbon-dioxide can be used for an energy recovery operation, where the energy recovery operation can convert the energy of the compressed gas to another energy type such as electrical energy. The energy conversion can support modularized energy management using pooling. An air capsule 740 can be located at the bottom 742 of a body of water, where the body of water can include fresh water, seawater, etc. Air or another gas can be expelled from the air capsule using pressure created by hydraulic head, where the hydraulic head is proportional to the distance between the surface 744 and the bottom 742 of the body of water. The distance between the water surface and the bottom can be 100 meters or more. The compressed gas from the air capsule can expand the volume of air within the water-based compression chamber 730. When heat is generated by compressing a gas such as air, nitrogen, or carbon-dioxide within a water-based compression chamber 730, the heat can be collected using a heat exchanger 732. In embodiments, the heat exchanger can include a water heat exchanger. Water from the water-based compression chamber can be transferred back to the high-pressure water reservoir 720. The water transferred back to the high-pressure water reservoir can cause water to be pushed through the pump-turbine 710, enabling the pump-turbine to spin. The spinning of the pump-turbine can generate electrical energy, thereby recovering electrical energy from the previously stored pressurized air or other gas.

Figure 8:
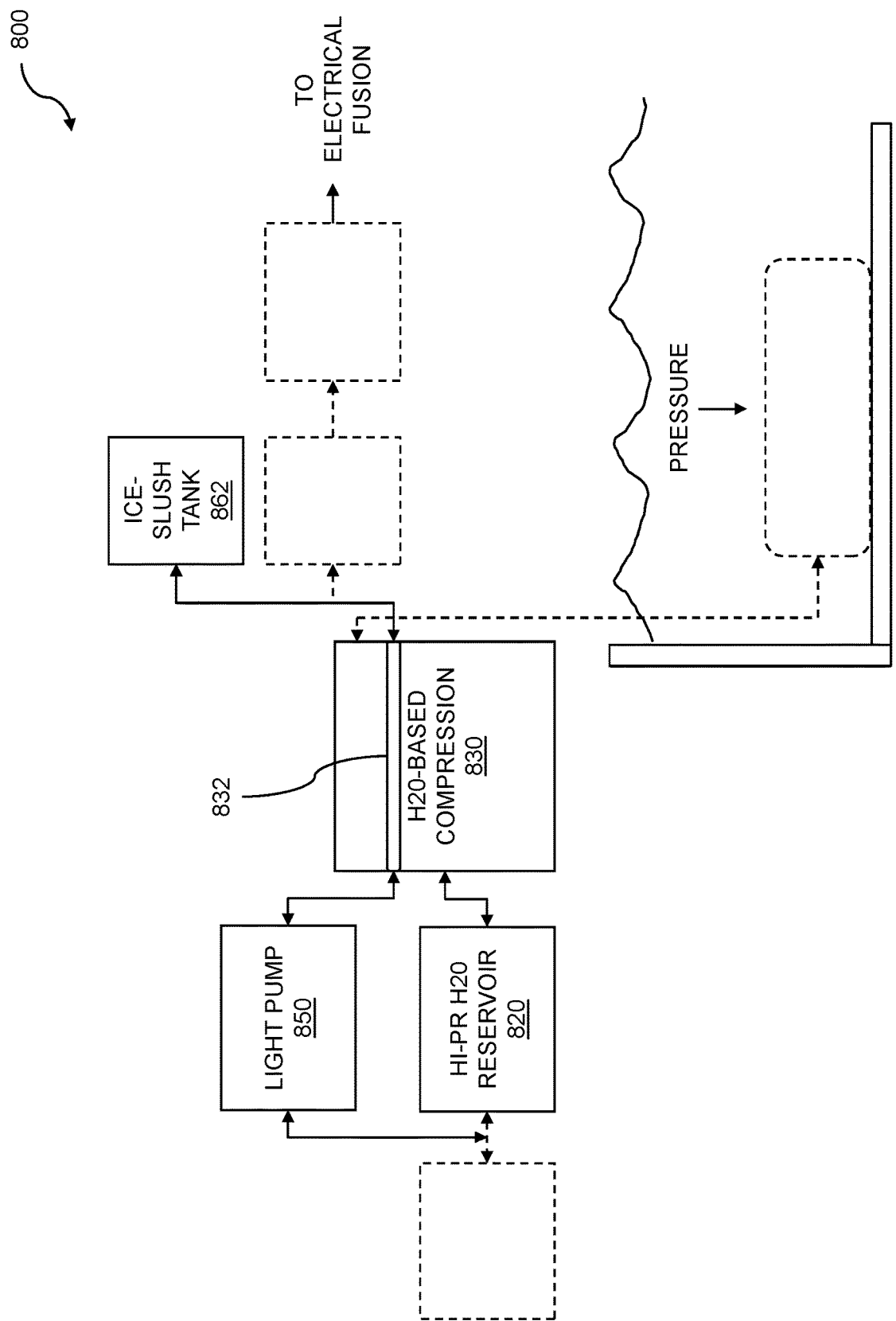
FIG. 8 illustrates waste heat recovery to ice-slush.

FIG. 8 illustrates waste heat recovery operation 800 to ice-slush. As the pressure on a gas decreases, the volume of the gas increases. Further, the temperature of the gas can decrease. The waste "heat" or cold can be recovered and stored for later use as thermal energy or can be converted to another form of energy. Recovering the heat from the gas can support modularized energy management using pooling. Thermal energy recovery comprises a subset of the operations performed for pump-energy storage. The expansion or decompression of a gas such as air, nitrogen, or carbon-dioxide within a water-based compression chamber 830 can cause the temperature of the gas within the chamber to decrease. Water in the water-based compression chamber can be pushed back to a high-pressure water reservoir 820. This decrease in thermal energy in the water-based compression chamber can be collected using a heat exchanger 832. In embodiments, the heat exchanger can include a water heat exchanger. The water cooled by the heat exchanger can be moved by a light pump 850 and stored for later use. The thermal energy from the chilled air in the water-based compression chamber can be pumped to chill water, carbon-dioxide, nitrogen, etc., in an ice-slush tank 862.

Figure 9:
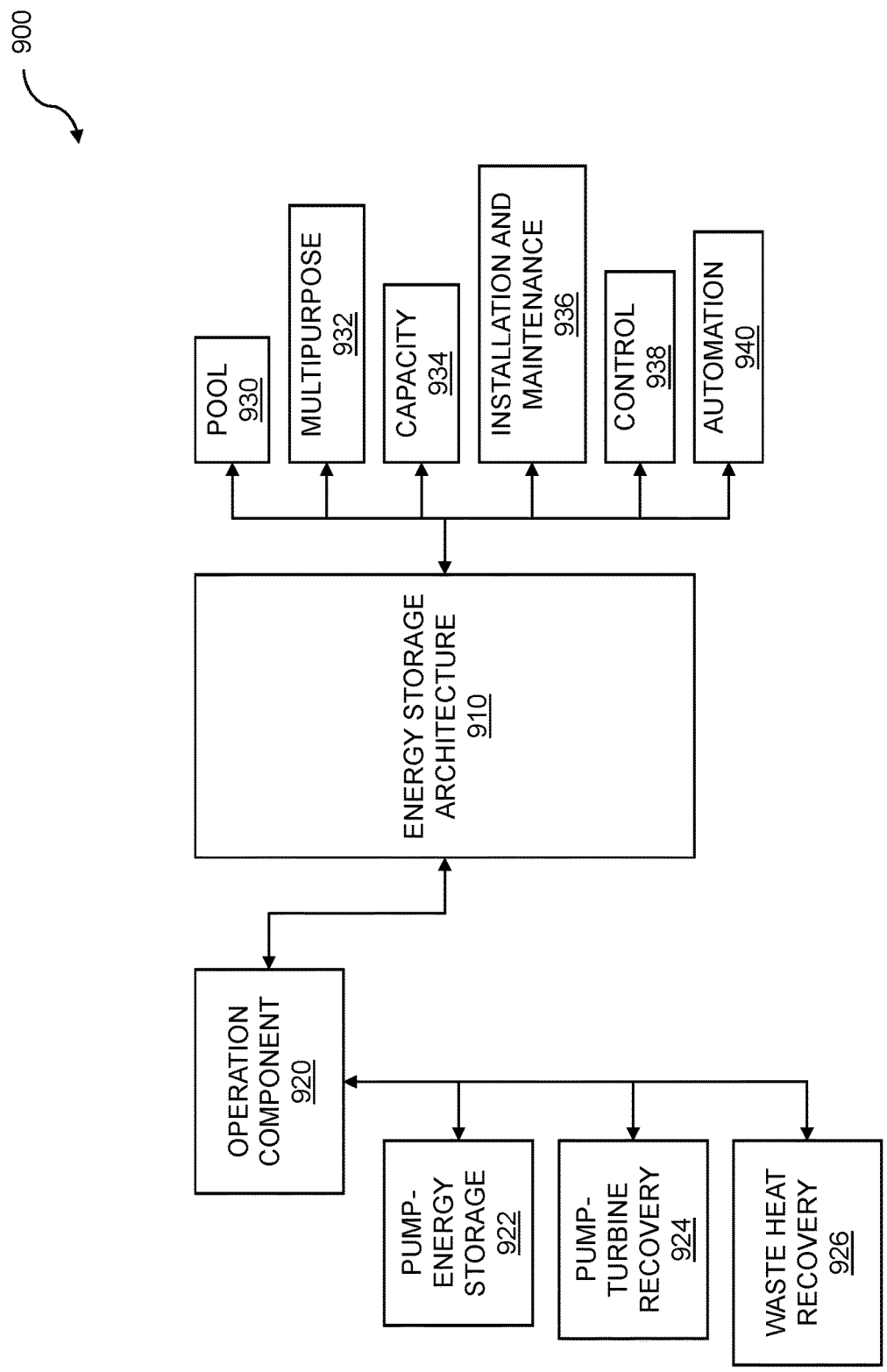
FIG. 9 shows a block diagram for pump-turbine energy storage.

FIG. 9 shows a block diagram for pump-turbine scalable energy storage.

Scalable energy storage can be based on a pump-turbine technique. The pump-turbine technique can include energy modules, where different types of energy modules can be used. Each type of energy module can store a type of energy such as heat or cold; pressure; material phases such as solid, liquid, or gas; electrical charge; and so on. More or fewer energy modules can be used or pooled. The energy modules can support modularized energy management using pooling. Pump-turbine energy storage 900 can be based on an energy storage architecture 910. The energy storage architecture can include scaling techniques. The scaling can include the addition of energy modules, the subtraction of energy modules, supporting redundancy of energy modules such as 1N redundancy or 2N redundancy, etc. The energy storage architecture can include fault tolerance techniques. The fault tolerance techniques can include the redundancy techniques, alternative energy sources, backup energy sources such as diesel-generator sets or batteries, and so on.

The block diagram can include an operation unit 920. The operation unit can provide access to key energy subsystems. The energy subsystems can be selected, allocated, controlled, etc. The operations can include energy storage, energy conversion, waste energy recovery, and so on. The operation component can access and control pump-energy storage 922. Pump energy storage can include driving a pump using energy such as electrical energy to store energy as pressure in a high-pressure chamber, a compression-expansion chamber, a compressed air chamber, and the like. Pump energy can include moving a liquid, such as a refrigerant, to cool water to form slush or ice; to create steam, etc. The block diagram can include pump-turbine recovery 924. Compressed air, for example, can be released from a chamber to spin a turbine, where the turbine can be used to spin a generator or alternator, etc. The operation component can include waste heat recovery 926. Compressing a gas such as atmospheric air can cause the temperature of the air to increase. The heat energy generated by the compressing can be collected using a heat exchanger or other technique. The collected heat energy can be stored for later use.

The block diagram can include techniques that support the energy storage architecture. The techniques can include pooling 930. The pooling can include accessing two or more energy storage modules to store energy or accessing two or more energy recovery modules to provide energy. The energy recovery modules can provide energy to meet present energy needs; predicted, estimated, or modeled energy needs; etc. The techniques can include multi-purposing 932 of energy modules. The energy modules can be purposed for primary storage, backup storage, redundancy storage, etc. The techniques can include capacity 934. Energy module capacity can be allocated, configured, and so on, based on present energy needs, estimated energy needs, seasonal energy needs, and the like. The techniques can include installation and maintenance 936. The energy modules can be hot swappable where one or more energy modules can be added to a storage architecture or removed from a storage architecture without having to shut down the energy storage architecture. The addition of an energy module can include installing the energy module, allocating the energy module to meet power needs, etc. The techniques can include control of energy modules 938. The controlling the operation of the one or more energy modules can include changing energy module redundancy. The redundancy can be based on 1N redundancy, 2N redundancy, N+1 redundancy, and so on. The controlling the operation of the one or more energy modules can include dynamically changing the number of energy modules within the plurality of energy modules. The techniques can include automation 940. Automation can be used to adjust energy capacity, to allocate energy modules, to deallocate energy modules, etc. In embodiments, the automation can be based on the results of system simulation, where the system simulation can enable critical state avoidance.

Figure 10A:
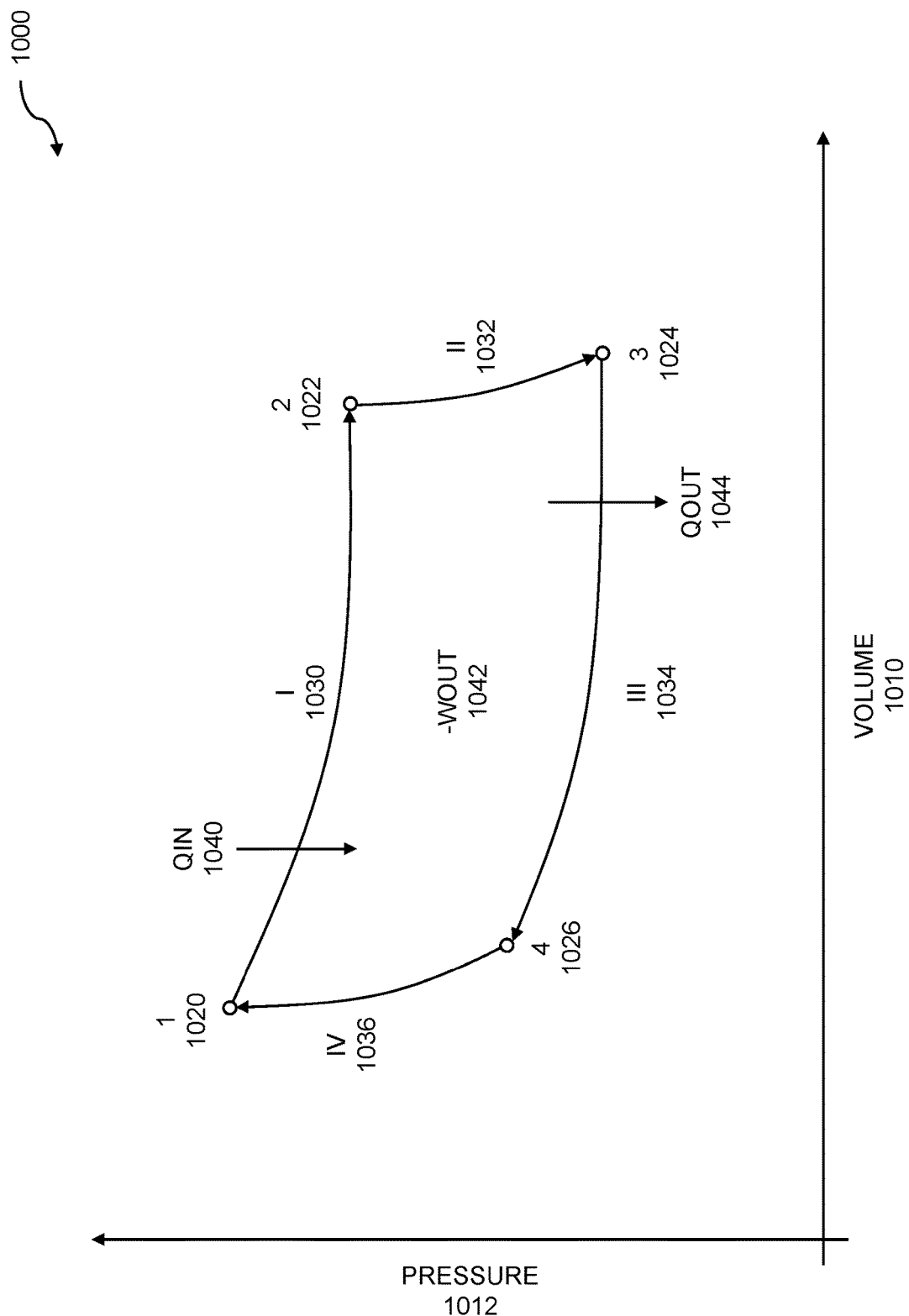
FIG. 10A illustrates adiabicity in a heat transfer cycle.

FIG. 10A illustrates adiabicity in a heat transfer cycle. An adiabatic process can occur when neither heat nor mass of a material is transferred between a given thermodynamic system and the environment that surrounds the thermodynamic system. "Adiabicity" can describe a quality of the adiabatic process. For the techniques described herein, an adiabatic process with adiabicity equal to zero percent is described as perfectly isothermal, while an adiabatic process with adiabicity equal to 100 percent is described as perfectly adiabatic. Adiabicity in a heat transfer cycle supports energy transfer through fluid flows. Energy storage and extraction can be based on modularized energy management using pooling. The pooling can include adding or removing energy modules as needed for energy storage or extraction based on energy demand. The energy modules can include multiple pressurized storage elements. Energy is obtained from one or more energy sources such as grid power, renewable micro-grid power, etc. Operating data is obtained from a plurality of energy modules within an energy storage system. One or more operating goals are obtained for the plurality of energy modules. One or more processors are used to analyze the operating data, the one or more operating goals, energy demand, and energy module operating health. The operation of one or more of the plurality of energy modules is controlled based on the analysis.

The figure shows a pressure—volume (PV) diagram 1000. A PV diagram can be used to show changes in pressure 1012 versus volume 1010 for one or more thermodynamic processes. A cycle such as a heat transfer cycle, can be based on the one or more thermodynamic processes. One lap around the cycle can complete the cycle, where the completed cycle can result in a net no change of system state. With reference to the PV diagram, at the end or completion of the cycle, the thermodynamic system state returns to a pressure and a volume equal to the pressure and the volume of the system at the beginning of the cycle. Four states are shown: state 1 1020, state 2 1022, state 3 1024, and state 4 1026. Each state 1 through 4 represents a pressure and a corresponding volume. While four states are shown, other numbers of states may be present for a given cycle. A path between two states can represent a process. Four processes are shown: process I 1030, process II 1032, process III 1034, and process IV 1036. While four processes are shown, other numbers of processes may be present within a given cycle.

A given process can affect a system pressure, a system volume, or both a system pressure and a system volume. For the heat transfer cycle shown, the processes can be isothermal such as process I and process III, or adiabatic such as process II and process IV. In general, the four processes shown can include isothermal expansion, such as between points 1 and 2; reversible adiabatic or isentropic expansion, such as between points 2 and 3; reversible isothermal compression, such as between points 3 and 4; and reversible adiabatic or isentropic compression, such as between points 3 and 4. Using the first law of thermodynamics, for a closed system, an amount of internal energy of the closed system can be calculated based on a quantity of input heat, such as input heat qin 1040 minus an amount of work performed by the system, such as −wout 1042. Any heat removed from the system, such as output heat qout 1044 can be determined to be equal to the quantity of input heat minus work.

Figure 10B:
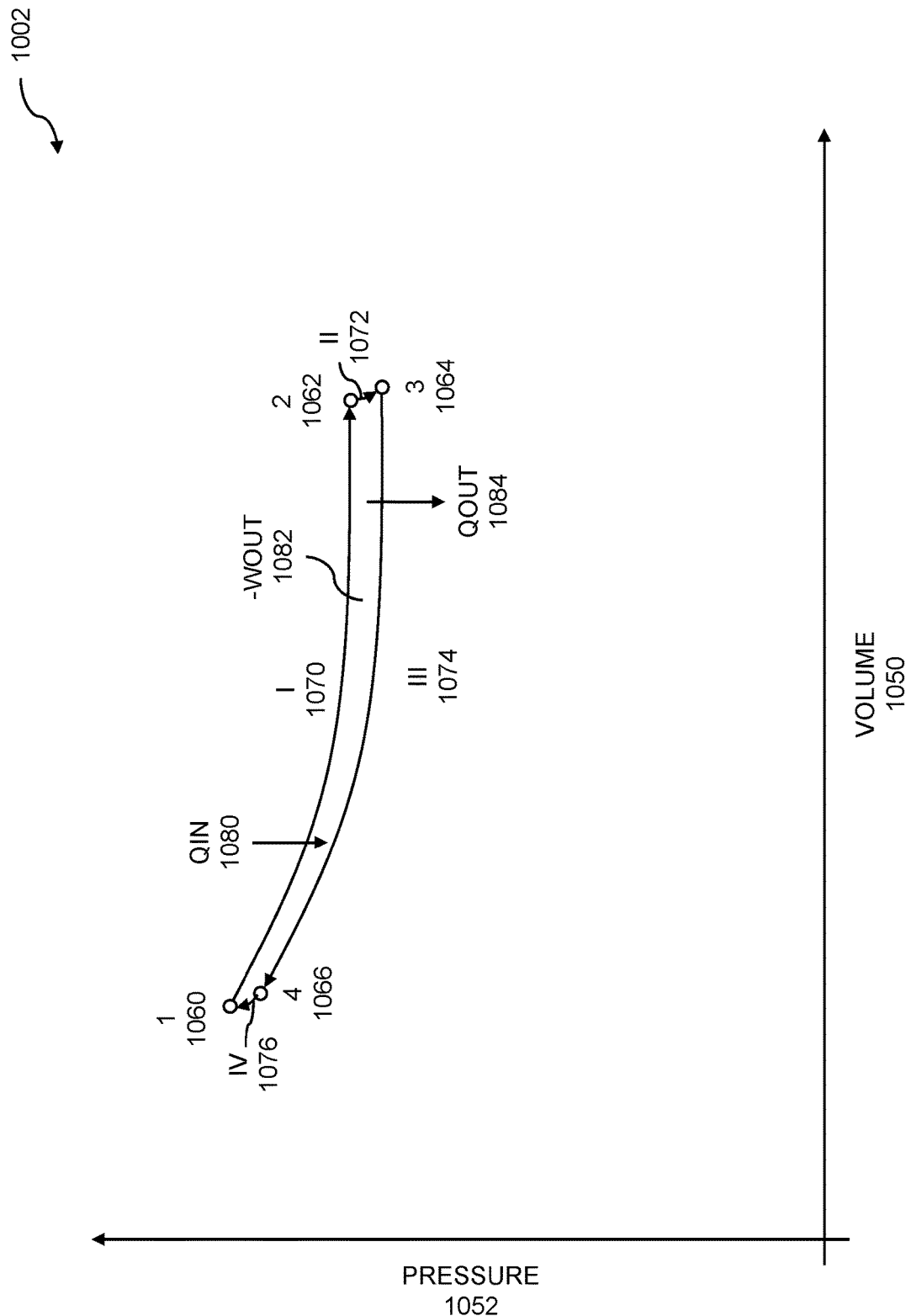
FIG. 10B illustrates an isothermal heat transfer cycle.

FIG. 10B illustrates an isothermal heat transfer cycle. A cycle of a thermodynamic system can include one or more thermodynamic processes. The thermodynamic processes can include isothermal processes and adiabatic processes. When the adiabicity of adiabatic processes is nearly equal to zero, then the thermal dynamic system can be described approximately as an isothermal system. An isothermal heat transfer thermodynamic system can support energy transfer through fluid flows. Energy storage and extraction can be based on modularized energy management using pooling. The pooling can include adding or removing energy modules as needed for energy storage or extraction based on energy demand. The energy modules can include multiple pressurized storage elements. Energy is obtained from one or more energy sources such as grid power, renewable micro-grid power, etc. Operating data is obtained from a plurality of energy modules within an energy storage system. One or more operating goals are obtained for the plurality of energy modules. One or more processors are used to analyze the operating data, the one or more operating goals, energy demand, and energy module operating health. The operation of one or more of the plurality of energy modules is controlled based on the analysis. Access to a fluid-based, local energy transfer distribution network is obtained, and one or more fluid-based energy storage and generation assemblies are connected to the network. Energy is provided to the one or more fluid-based energy storage and generation assemblies, and fluid-based energy from the energy storage and generation assemblies is delivered to the fluid-based, local energy transfer distribution network. The delivering is based on an energy control management system executing on one or more processors.

A pressure—volume (PV) diagram is shown in the FIG. 1002. The PV diagram can plot pressure versus volume, and can show one or more states, where each state 1 through 4 comprises a pressure 1052 and a corresponding volume 1050. Four states are shown: state 1 1060, state 2 1062, state 3 1064, and state 4 1066. While four states are shown, other numbers of states may be present for a given cycle. A path between two states can represent a process. A process can include an isothermal process or an adiabatic process. A given process can impact the thermodynamic system by changing pressure, volume, or both pressure and volume. Four processes are shown: process I 1070, process II 1072, process III 1074, and process IV 1076. While four processes are shown, other numbers of processes may be present within a given cycle. For the isothermal heat transfer cycle shown, process I and process III can be isothermal. The adiabatic processes, process II and process IV can be as close to zero possible. The adiabatic processes II and IV can have an adiabicity nearly equal to zero. Recall that for a closed thermodynamic system, an amount of internal energy of the closed system can be calculated based on a quantity of input heat, such as input heat qin 1080 minus an amount of work performed by the system, such as −wout 1082. Any heat removed from the system, such as output heat qout 1084 can be determined to be equal to the quantity of input heat minus work.

Figure 11:
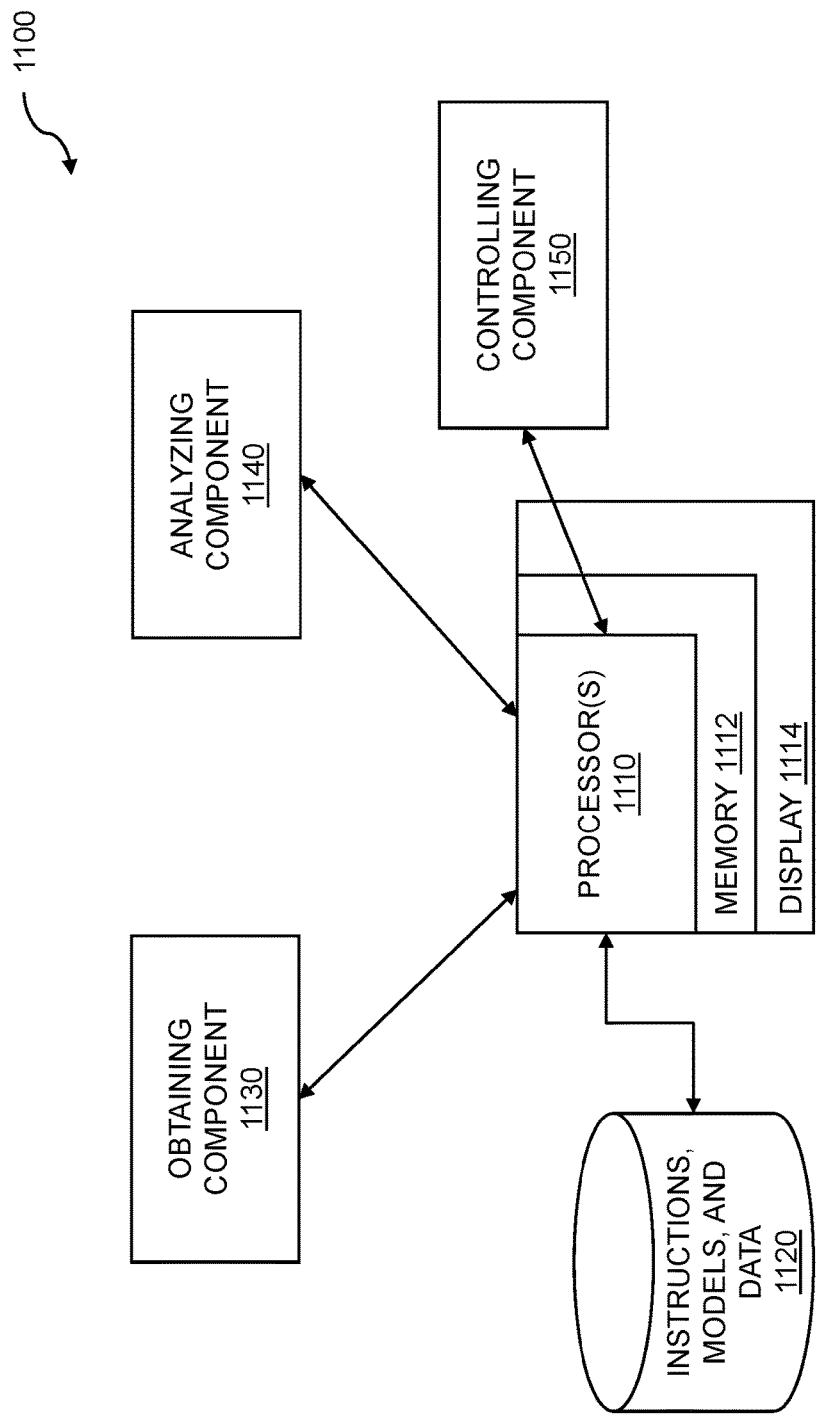
FIG. 11 is a system diagram for modularized energy management using pooling.

FIG. 11 shows a system diagram for modularized energy management using pooling. Operating data is obtained from a plurality of energy modules within an energy storage system. The plurality of energy modules can be pooled, where the energy modules that are pooled include energy module peers. Additional energy module peers can be dynamically added to the plurality of energy modules. The energy module peers can include pump-turbine peers, high-pressure container peers, or compression-expansion chamber peers. The energy module peers can include water heat exchangers. One or more operating goals are obtained for the plurality of energy modules. One or more processors are used to analyze the operating data, the one or more operating goals, energy demand, and energy module operating health. The operating goals can be based on cost or energy production, storage, or recovery, energy module availability, or energy module status. The operation of one or more of the plurality of energy modules is controlled based on the analysis. The controlling the operation of the one or more of the plurality of energy modules can include changing energy module redundancy. The controlling the operation of the one or more of the plurality of energy modules can include dynamically changing the number of energy modules within the plurality of energy modules. The controlling the plurality of energy modules can include controlling over a time period. The time period can be a short-term basis, where a short-term basis can include an integer number of seconds, minutes, or days substantially less than a week, and so on. The time period can be a long-term basis, where a long-term basis can include an integer number of weeks, months, seasons, or years, and where the integer number of weeks, months, seasons, or years includes a length of time that can be substantially more than one day. An energy module can store energy in various energy types. An energy module can include compressed air, steam, liquid nitrogen, ice, and so on.

The system 1100 can include one or more processors 1110 and a memory 1112 which stores instructions. The memory 1112 is coupled to the one or more processors 1110, wherein the one or more processors 1110 can execute instructions stored in the memory 1112. The memory 1112 can be used for storing instructions, for storing databases of energy modules, for storing models of energy demands, for storing energy module operating health, for system support, and the like. Information regarding energy management using pooling can be shown on a display 1114 connected to the one or more processors 1110. The display can comprise a television monitor, a projector, a computer monitor (including a laptop screen, a tablet screen, a netbook screen, and the like), a smartphone display, a mobile device, or another electronic display. The system 1100 includes instructions, models, and data 1120. In embodiments, the instructions, models, and data 1120 are stored in a networked database, where the networked database can be a local database, a remote database, a distributed database, and so on. The instructions, models, and data 1120 can include instructions for obtaining operating data and operating goals from a plurality of energy modules, instructions for analyzing operating data, instructions for controlling the operation of energy modules, etc.

The system 1100 includes an obtaining component 1130. The obtaining component 1130 can obtain operating data from a plurality of energy modules within an energy storage system. The operating data can include temperature, pressure, state of charge, availability, cost, and so on. The obtaining component can obtain one or more operating goals for the plurality of energy modules. The operating goals can include meeting current energy demand, anticipating energy demand, obtaining a cost objective, and the like. The system 1100 includes an analyzing component 1140. The analyzing component 1140 can be used for analyzing the operating data, the one or more operating goals, energy demand, energy module operating health, etc. The analyzing can include system simulation of the modularized energy management system. In embodiments, the system simulation can enable critical state avoidance.

The system 1100 includes a controlling component 1150. The controlling component 1150 can control the operation of one or more of the plurality of energy modules, based on the analysis. The controlling the operation of the one or more of the plurality of energy modules can include changing energy module redundancy. The energy module redundancy can be based on 1N redundancy, 2N redundancy, etc. In embodiments, the controlling the operation of the one or more of the plurality of energy modules can include dynamically changing the number of energy modules within the plurality of energy modules. The number of energy modules of various types can be increased or decreased based on energy storage needs, usage needs, and so on. The controlling can include transforming energy into a storable energy type, such as converting electricity to pressurized air, heat, cold, etc. In embodiments, the controlling can include controlling a compression ratio between one or more of the plurality of energy modules.

Disclosed embodiments can include a computer program product embodied in a non-transitory computer readable medium for energy management, the computer program product comprising code which causes one or more processors to perform operations of: obtaining operating data from a plurality of energy modules within an energy storage system; obtaining one or more operating goals for the plurality of energy modules; analyzing the operating data, the one or more operating goals, energy demand, and energy module operating health; and controlling operation of one or more of the plurality of energy modules, based on the analyzing, wherein two or more of the plurality of energy modules are pooled. Disclosed embodiments can include a computer system for energy management comprising: a memory which stores instructions; one or more processors attached to the memory wherein the one or more processors, when executing the instructions which are stored, are configured to: obtain operating data from a plurality of energy modules within an energy storage system; obtain one or more operating goals for the plurality of energy modules; analyze the operating data, the one or more operating goals, energy demand, and energy module operating health; and control operation of one or more of the plurality of energy modules, based on the analysis, wherein two or more of the plurality of energy modules are pooled.

Each of the above methods may be executed on one or more processors on one or more computer systems. Embodiments may include various forms of distributed computing, client/server computing, and cloud-based computing. Further, it will be understood that the depicted steps or boxes contained in this disclosure's flow charts are solely illustrative and explanatory. The steps may be modified, omitted, repeated, or re-ordered without departing from the scope of this disclosure. Further, each step may contain one or more sub-steps. While the foregoing drawings and description set forth functional aspects of the disclosed systems, no particular implementation or arrangement of software and/or hardware should be inferred from these descriptions unless explicitly stated or otherwise clear from the context. All such arrangements of software and/or hardware are intended to fall within the scope of this disclosure.

The block diagrams and flowchart illustrations depict methods, apparatus, systems, and computer program products. The elements and combinations of elements in the block diagrams and flow diagrams, show functions, steps, or groups of steps of the methods, apparatus, systems, computer program products and/or computer-implemented methods. Any and all such functions—generally referred to herein as a "circuit," "module," or "system"— may be implemented by computer program instructions, by special-purpose hardware-based computer systems, by combinations of special purpose hardware and computer instructions, by combinations of general purpose hardware and computer instructions, and so on.

A programmable apparatus which executes any of the above-mentioned computer program products or computer-implemented methods may include one or more microprocessors, microcontrollers, embedded microcontrollers, programmable digital signal processors, programmable devices, programmable gate arrays, programmable array logic, memory devices, application specific integrated circuits, or the like. Each may be suitably employed or configured to process computer program instructions, execute computer logic, store computer data, and so on.

It will be understood that a computer may include a computer program product from a computer-readable storage medium and that this medium may be internal or external, removable and replaceable, or fixed. In addition, a computer may include a Basic Input/Output System (BIOS), firmware, an operating system, a database, or the like that may include, interface with, or support the software and hardware described herein.

Embodiments of the present invention are neither limited to conventional computer applications nor the programmable apparatus that run them. To illustrate: the embodiments of the presently claimed invention could include an optical computer, quantum computer, analog computer, or the like. A computer program may be loaded onto a computer to produce a particular machine that may perform any and all of the depicted functions. This particular machine provides a means for carrying out any and all of the depicted functions.

Any combination of one or more computer readable media may be utilized including but not limited to: a non-transitory computer readable medium for storage; an electronic, magnetic, optical, electromagnetic, infrared, or semiconductor computer readable storage medium or any suitable combination of the foregoing; a portable computer diskette; a hard disk; a random access memory (RAM); a read-only memory (ROM), an erasable programmable read-only memory (EPROM, Flash, MRAM, FeRAM, or phase change memory); an optical fiber; a portable compact disc; an optical storage device; a magnetic storage device; or any suitable combination of the foregoing. In the context of this document, a computer readable storage medium may be any tangible medium that can contain or store a program for use by or in connection with an instruction execution system, apparatus, or device.

It will be appreciated that computer program instructions may include computer executable code. A variety of languages for expressing computer program instructions may include without limitation C, C++, Java, JavaScript™, ActionScript™, assembly language, Lisp, Perl, Tcl, Python, Ruby, hardware description languages, database programming languages, functional programming languages, imperative programming languages, and so on. In embodiments, computer program instructions may be stored, compiled, or interpreted to run on a computer, a programmable data processing apparatus, a heterogeneous combination of processors or processor architectures, and so on. Without limitation, embodiments of the present invention may take the form of web-based computer software, which includes client/server software, software-as-a-service, peer-to-peer software, or the like.

In embodiments, a computer may enable execution of computer program instructions including multiple programs or threads. The multiple programs or threads may be processed approximately simultaneously to enhance utilization of the processor and to facilitate substantially simultaneous functions. By way of implementation, any and all methods, program codes, program instructions, and the like described herein may be implemented in one or more threads which may in turn spawn other threads, which may themselves have priorities associated with them. In some embodiments, a computer may process these threads based on priority or other order.

Unless explicitly stated or otherwise clear from the context, the verbs "execute" and "process" may be used interchangeably to indicate execute, process, interpret, compile, assemble, link, load, or a combination of the foregoing. Therefore, embodiments that execute or process computer program instructions, computer-executable code, or the like may act upon the instructions or code in any and all of the ways described. Further, the method steps shown are intended to include any suitable method of causing one or more parties or entities to perform the steps. The parties performing a step, or portion of a step, need not be located within a particular geographic location or country boundary. For instance, if an entity located within the United States causes a method step, or portion thereof, to be performed outside of the United States then the method is considered to be performed in the United States by virtue of the causal entity.

While the invention has been disclosed in connection with preferred embodiments shown and described in detail, various modifications and improvements thereon will become apparent to those skilled in the art. Accordingly, the foregoing examples should not limit the spirit and scope of the present invention; rather it should be understood in the broadest sense allowable by law.

What is claimed is:

1. A computer-implemented method for energy management comprising:
obtaining operating data from a plurality of energy modules within an energy storage system, the energy storage system comprising a pump-turbine system wherein the pump-turbine system utilizes high-pressure storage;
obtaining one or more operating goals for the plurality of energy modules;
analyzing the operating data, the one or more operating goals, energy demand, and energy module operating health; and
controlling operation of one or more of the plurality of energy modules, based on the analyzing, wherein two or more of the plurality of energy modules are pooled; wherein the controlling includes dynamically changing the number of energy modules within the plurality of energy modules; and wherein at least one energy module of the plurality of energy modules comprises a thermal energy module, and wherein the thermal energy module includes an ice-slush tank.

2. The method of claim 1 wherein the plurality of energy modules that are pooled comprise a homogeneous bank of energy modules.

3. The method of claim 1 wherein the plurality of energy modules that are pooled comprise two or more homogeneous banks of heterogeneous energy modules.

4. The method of claim 1 wherein the controlling operation of the one or more of the plurality of energy modules includes changing an energy module redundancy.

5. The method of claim 1 wherein the plurality of energy modules that are pooled include energy module peers.

6. The method of claim 5 wherein additional energy module peers are dynamically added to the plurality of energy modules.

7. The method of claim 5 wherein the energy module peers include pump-turbine peers, high-pressure container peers, or compression-expansion chamber peers.

8. The method of claim 5 wherein the energy module peers include water heat exchangers.

9. The method of claim 1 wherein the energy storage system includes compressed air storage.

10. The method of claim 9 wherein the compressed air storage is underground.

11. The method of claim 9 wherein the compressed air storage is under seawater.

12. The method of claim 1 wherein the high-pressure storage includes a plurality of high-pressure containers.

13. The method of claim 12 wherein the plurality of high-pressure containers contains water held at high pressure.

14. The method of claim 1 wherein the pump-turbine system utilizes compression-expansion chambers.

15. The method of claim 1 wherein the pump-turbine system utilizes a compressed air chamber.

16. The method of claim 15 wherein the compressed air chamber is facilitated by deep water pressure.

17. The method of claim 1 wherein the analyzing includes system simulation.

18. The method of claim 17 wherein the system simulation enables critical state avoidance.

19. The method of claim 1 wherein the controlling further comprises transforming energy into a storable energy type.

20. The method of claim 1 wherein the controlling further comprises release of stored energy from a storage element within the energy storage system.

21. A computer program product embodied in a non-transitory computer readable medium for energy management, the computer program product comprising code which causes one or more processors to perform operations of:
obtaining operating data from a plurality of energy modules within an energy storage system, the energy storage system comprising a pump-turbine system wherein the pump-turbine system utilizes high-pressure storage;
obtaining one or more operating goals for the plurality of energy modules;
analyzing the operating data, the one or more operating goals, energy demand, and energy module operating health; and
controlling operation of one or more of the plurality of energy modules, based on the analyzing, wherein two or more of the plurality of energy modules are pooled; wherein the controlling includes dynamically changing the number of energy modules within the plurality of energy modules; and wherein at least one energy module of the plurality of energy modules comprises a thermal energy module, and wherein the thermal energy module includes an ice-slush tank.

22. A computer system for energy management comprising:
a memory which stores instructions;
one or more processors attached to the memory wherein the one or more processors, when executing the instructions which are stored, are configured to:
obtain operating data from a plurality of energy modules within an energy storage system, the energy storage system comprising a pump-turbine system wherein the pump-turbine system utilizes high-pressure storage;
obtain one or more operating goals for the plurality of energy modules;
analyze the operating data, the one or more operating goals, energy demand, and energy module operating health; and
control operation of one or more of the plurality of energy modules, based on the analysis, wherein two or more of the plurality of energy modules are pooled, wherein controlling includes dynamically changing the number of energy modules within the plurality of energy modules, and wherein at least one energy module of the plurality of energy modules comprises a thermal energy module, and wherein the thermal energy module includes an ice-slush tank.

23. The method of claim 1 wherein dynamically changing the number of energy modules within the plurality of energy modules includes adding or removing energy modules without disrupting operation of the energy storage system.

24. The method of claim 23 further comprising using automation to adjust an energy capacity of the energy storage system, to allocate energy modules, or to deallocate energy modules.

25. The method of claim 9 wherein the compressed air storage is located under 100 meters or greater of water.

26. The method of claim 5 wherein the energy storage system further comprises a plurality of pre-heater peers coupled to an interconnection that also includes a plurality of compressed air chambers.

27. The method of claim 1 wherein the ice-slush tank contains at least one of carbon-dioxide and nitrogen.

* * * * *